United States Patent [19]

Krzecki

[11] Patent Number: 5,075,945

[45] Date of Patent: Dec. 31, 1991

[54] TOOL FOR REMOVING SEALS

[76] Inventor: Josef Krzecki, 414 Hill Rd., McHenry, Ill. 60050

[21] Appl. No.: 606,708

[22] Filed: Oct. 31, 1990

[51] Int. Cl.[5] .......... B23P 19/04

[52] U.S. Cl. .......... 29/235; 29/267

[58] Field of Search .......... 29/280, 278, 272, 267, 29/235, 253, 213.1

[56] References Cited

U.S. PATENT DOCUMENTS

| | | | |
|---|---|---|---|
| 532,557 | 1/1895 | Hoffman . | |
| 1,632,482 | 6/1927 | Kroells . | |
| 2,148,701 | 2/1939 | Loy . | |
| 2,471,557 | 5/1949 | Bishop . | |
| 2,902,849 | 9/1959 | Gipslis . | |
| 3,029,503 | 4/1962 | Meyer . | |
| 3,063,148 | 11/1962 | Brilmyer | 29/267 |
| 3,097,429 | 7/1963 | Frye et al. | 29/280 |
| 3,130,615 | 4/1964 | Harrup, Sr. . | |
| 3,579,797 | 5/1971 | Pepe . | |
| 3,689,977 | 9/1972 | Crabbe | 29/280 |
| 3,736,643 | 6/1973 | Pepe . | |
| 3,909,899 | 10/1975 | Witt . | |
| 3,978,573 | 9/1976 | Williams | 29/267 |
| 4,211,446 | 7/1980 | Shultz, Sr. . | |
| 4,330,917 | 5/1982 | Dzurkovich . | |
| 4,648,165 | 3/1987 | Whitehorne . | |
| 4,649,618 | 3/1987 | Harrison | 29/267 |
| 4,813,120 | 3/1989 | Fournier | 29/267 |
| 4,982,483 | 1/1991 | Roush | 29/280 |

FOREIGN PATENT DOCUMENTS

| | | |
|---|---|---|
| 163087 | 5/1949 | Australia . |
| 651099 | 10/1962 | Canada . |
| 997915 | 10/1966 | Canada . |
| 1130451 | 12/1984 | U.S.S.R. . |

*Primary Examiner*—Robert C. Watson

*Attorney, Agent, or Firm*—Leydig, Voit & Mayer

[57] ABSTRACT

A hand-held tool that may be used to quickly and accurately push a seal from an opening in a housing without causing damage to the inside surface of the housing. The tool includes a shaft having a handle at one end and a working head at the opposite end. The working head includes an angled surface from which a tooth extends outwardly. The tooth is spaced away from the end of the head to form a tip. During operation, the adjacent contact surfaces of the tip and the tooth engage the edge of a ring seal, such that the tool is used to push the ring seal through the opening without damaging the interior surface of the housing.

15 Claims, 1 Drawing Sheet

TOOL FOR REMOVING SEALS

FIELD OF THE INVENTION

This invention relates generally to seals and, more specifically, to hand-held tools for removing ring seals.

BACKGROUND OF THE INVENTION

Ring seals are used in numerous applications in motorized systems, including in vehicles. For example, semi-rigid ring seals are commonly used in vehicle transmission assemblies to prevent the escape of transmission fluid from the system. The seal is disposed within an inside cavity of the housing to prevent the passage of fluid along the adjacent surfaces. During repairs or maintenance, such a seal must often be moved from its assembled position so that a mechanic may repair or perform maintenance operations on the associated vehicle system. As the seal is often disposed deep within a cavity of the housing, it can be extremely cumbersome and difficult to remove. Furthermore, other components of the system, such as bearings, may also be disposed within the cavity of the housing; such obstructions further complicate removal of the seal and disassembly of the system. Often, mechanics wedge screw drivers or other makeshift tools against the seal to force the seal through the housing. As these devices are not designed for use in this situation, they often slip from position against the seal and score or otherwise damage the interior surface of the housing cavity. Such damage to the interior surface results in fluid leakage past the seal in a reassembled system. As damage to the interior of the housing generally cannot be repaired, the entire housing must be replaced. Such replacement is extremely time consuming and, of course, costly. In certain vehicle systems, as with the replacement of a damaged transmission housing, this cost can be prohibitive. For example, replacement of a front-wheel drive transmission housing in an automobile can exceed several thousand dollars. Thus, an otherwise uncomplicated and relatively inexpensive repair may result in a costly replacement of the housing if an inappropriate tool is utilized.

SUMMARY OF THE INVENTION

It is the primary object of the invention to provide a tool which facilitates the removal of a ring seal from an inside cavity of a housing without damaging the interior surface of the housing.

An additional object is to reduce the costs and potential costs associated with repairs which require the movement or removal of the seal from the inside surface of a housing. A related object is to reduce the time required to perform repairs which involve the removal of a seal.

Another object is to provide a tool that permits easy access to seals disposed deep within a cavity or within a cavity having additional components assembled therein.

Other objects and advantages of the invention will be apparent from the following detailed description.

In accordance with the present invention, there is provided a hand-held tool for removing a seal from a cylindrical opening in a housing by impelling the seal through the opening. The tool has an elongated shaft with a grip at one end and a working head at the opposite end. The working head has a surface that is disposed at an angle to the axis of the shaft. An integrally formed tooth extends outward from the surface and is spaced away from the outward end of the head so that a tip is formed at the end of the head. The junction or intersection of adjacent surfaces of the lip and the tooth form a seal seat (or notch) for engaging an edge of the seal so that it can be pushed from its position in the housing. During usage, a mechanic aligns the tooth and the lip with the edge of the seal so that the lip seats along the inside diameter of the seal and the tooth abuts a side of the seal. Holding the tool handle, the mechanic then uses the tool to push the seal through the opening in the housing so that it may be removed from the opposite end.

Because the tooth and lip firmly seat against an inside edge of the seal, the mechanic can steadily impel the seal through the opening in the housing without the tool slipping from position and damaging the interior surface of the housing. Inasmuch as the height of the tooth is less than the side dimension of the seal, there is no danger of the tooth scoring the interior surface of the housing. Consequently, the tool reduces the time required for performing repairs in that the mechanic can quickly remove the seal in order to perform maintenance on the system.

These and other features and advantages of the invention will be more readily apparent upon reading the following description of a preferred embodiment of the invention and upon reference to the accompanying drawings, wherein:

DESCRIPTION OF THE PREFERRED EMBODIMENT

While the invention will be described in connection with certain preferred embodiments, it will be understood that it is not intended to limit the invention to those specific embodiments. Rather it is intended to cover all such alternative embodiment, modifications and equivalents as fall within the spirit and scope of the invention as defined in the appended claims.

Figure 1:
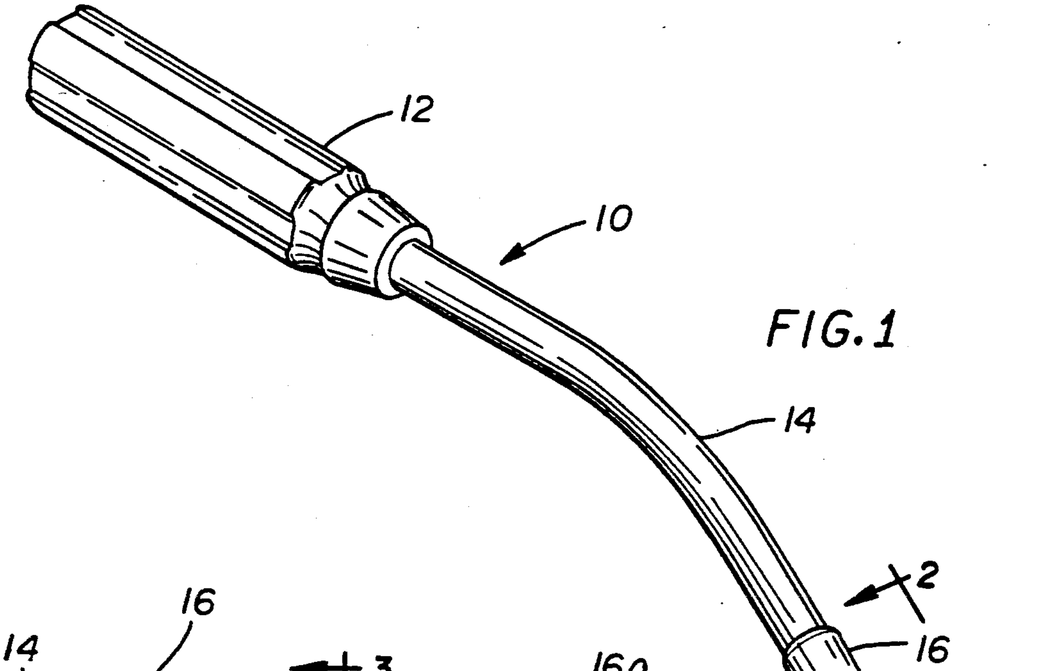
FIG. 1 is a perspective view of a tool embodying the present invention.

Turning now to the drawings, and referring first to FIG. 1, there is shown a tool 10 for removing a ring seal from an opening in a housing. The tool 10 comprises a grip portion or handle 12 from which an elongated shaft 14 projects. Disposed at the end of the shaft 14 is a head 16. Holding the handle 12, a mechanic may place the head 16 against the seal and use the tool 10 to push the seal through the opening of the housing.

The grip or handle portion 12 may be of any appropriate shape or material that provides a comfortable and steady feel for the mechanic. It may have a hand-formed shape or may be corrugated for a firm grip, as shown in the embodiment illustrated in FIG. 1. Further, the handle may be of material such as plastic or a hard rubber molded directly onto the shaft 14 or assembled onto the shaft 14 as a separate component. Alternately, the handle 14 may be integrally formed with the shaft 14 such that the entire tool 10 is formed of a single material.

The shaft 14 may likewise be of any appropriate material or cross-sectional shape. In a preferred embodiment, the shaft is a hardened steel, which provides a rigid and durable extension of the handle 12. In order to facilitate easy access to a seal disposed deep within a housing or to which access is obstructed by other components of the system, the shaft 14 may be angled or bent. For example, in the tool 10 shown in FIG. 1, the shaft 14 is bent to form a center angle of 20°–25° from linear and, thus, the tool is particularly suited for easy access to differential seals seated deep inside a transmission housing, access to which is obstructed by the saddle bearings. It will be appreciated that alternate angles may be appropriate for utilization of the invention in other assemblies.

In accordance with the invention, the head 16 includes a surface 18 which is disposed at an angle to the axis 20 of the shaft 14 such that the head 16 tapers to a distal end 16*a* of reduced size. A tooth 22, which extends outward from the angled surface 18, is spaced away from the distal end 16*a* of the head 16 to define a working tip. The adjacent contact surfaces of the tooth and the tip form a seal seat (i.e., notch) at the distal end of the head 16. During use, a mechanic positions the contact surface of the tip along the inside surface of the seal and the contact surface of the tooth along the side of the seal. As the notch formed at the junction of the tip and tooth firmly seats against the seal, the mechanic may apply force to the tool 10 along the axis of the housing opening to impel the seal from its assembled position.

Figure 2:
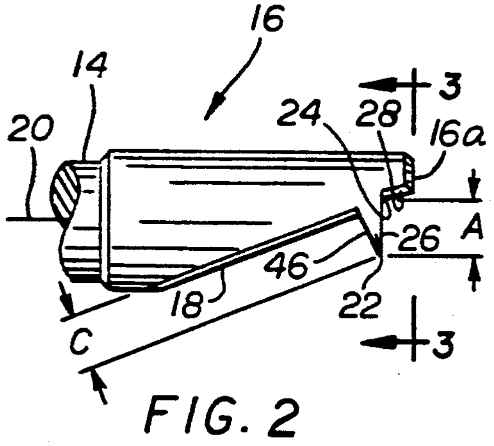
FIG. 2 is an enlarged side plan view of the working tip of the tool taken along the line 2—2 in FIG. 1.
Figure 3:
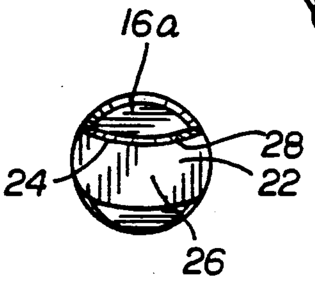
FIG. 3 is an enlarged end view of the working tip taken along the line 3—3 in FIG. 2.
Figure 4:
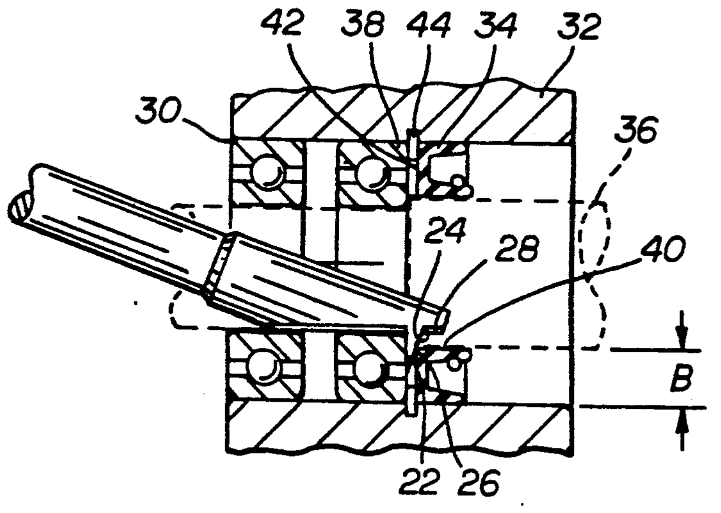
FIG. 4 is a side view of the working tip of the tool disposed in a housing assembly.

According to an important aspect of the invention, the head 16, shown in the enlarged side and end views of FIGS. 2 and 3, respectively, seats firmly and steadily against the seal to prevent inadvertent undesirable scoring of the inside surface of the housing. As shown in the enlarged side view of FIG. 2, surface 18 of the head 16 is disposed at an angle to the axis 20 of the shaft 14 so that the head 16 tapers toward the distal end 16*a* of the tool 10. Additionally, a tooth 22, which may be integrally formed with the head 16, extends outward from the angled surface 18. The tooth 22 is spaced inward from the end of the head 16 to define a tip 24. Adjacent surfaces 26, 28 of the tooth 22 and the tip 24 provide contact surfaces (i.e., a notch) into which the seal seats or abuts during use. During use of the tool, the tooth 22 and tip 24 are situated so that the edge of the seal 26 is engaged at the juncture of the contact surfaces 26, 28, as shown in FIG. 4. Consequently, the head 16 (and, therefore, the tool 10) firmly seats against the seal such that it will not slip from position during usage.

The structure and function of the head 16 may be more clearly described with reference to FIG. 4, which shows the head 16 of the tool 10 positioned in an opening 30 of a housing 32. While use of the tool 10 is described with reference to a specific type of automobile system, it will be appreciated that the tool 10 may likewise be used to facilitate removal of any type of ring seal from the interior of a housing 32.

When used to remove a semi-rigid ring seal 34 from the inside of a housing 32 of an automobile front wheel drive transmission system, as illustrated in FIG. 4, the drive shaft 36 (shown in phantom in FIG. 4) is first removed from the housing. Grasping the handle 12, a mechanic then inserts the head 16 and shaft 14 of the tool 10 into the opening 30 previously occupied by the drive shaft 36. When the head 16 is properly positioned within the opening 30, the angled surface 18 should abut against the inside surface of the ring bearing 38 with the tooth 22 extending toward the inside wall of the opening 30 of the housing 32 between the bearing 38 and the seal 34. Furthermore, when properly positioned, the contact surfaces 26, 28 of the tooth 22 and tip 24 substantially abut the inside surface 40 and side 42 of the ring seal 34. Grasping the handle 12, the mechanic then moves the tool 10 in the axial direction of the housing opening 30 (as indicated by the arrow in FIG. 4) to impel the seal 34 through the opening 30 in the housing 32 so that it may be removed from the opposite end. The mechanic is then free to remove the remaining components of the system from the inside of the housing 32. For example, the snap ring 44 and bearings 38 may be removed as maintenance of a transmission system requires.

According to an important aspect of the invention, the tooth 22 and the tip 24 are configured so as to substantially conform to the inside surface 40 and edge of the ring seal 34 to ensure that the tool 10 seats firmly against the seal 34. Consequently, and as shown in FIG. 3, the radius of the contact surface 28 of the tip 24 depends upon the inside radius of the particular seal 34 for which the tool 10 is designed. As will be readily appreciated, the inventive tool may be manufactured in various sizes to accommodate ring seals of different sizes. For a proper fit, the radius of the surface 28 should be substantially the same as or slightly smaller than the inside radius of the seal 34 to ensure good contact.

Similarly, the angled surface 18 may also be arcuate so that it substantially conforms to the inside surface of the housing 32 in which the seal 34 is seated. Alternately, the angled surface 18 may substantially conform to the inside surface of other components of the system, such as the bearing 38 shown in FIG. 4. Accordingly, the head 16 mates well with the inside diameter of the bearing 38, and the contact surface 28 of the tip 24 may be easily positioned along the inside surface of the seal 34.

In order to further provide easy and proper positioning of the head 16 within the housing 32, the tooth 22 may be of a wedge shape, tapering as it extends outward from the angled surface 18. In this way, the relatively sharp edge of the tooth 22 may be reliably positioned between the bearing 38 and the seal 34, as shown in FIG. 4. According to an important aspect of the invention, the height of the contact surface 26 of the tooth 22 (as represented by the letter A in FIG. 2) is smaller than the side dimension of the seal 26 (as represented by the letter B in FIG. 4). In this way, when the head 16 of the tool is properly seated against the seal 34, as shown in FIG. 4, the tooth 22 is spaced apart from the inside surface of the housing and cannot score the inside surface as the mechanic impels the seal 34 through the opening 30.

It can be readily appreciated that the design of tooth 22 (along with its relationship to the contact surface 28 of the tip 24 and the angled surface 18 of the head 16) are dependent upon the relative dimensions (and the relationship) of the seal 34 to the bearing 38. The shape of the tooth 22, including the dimensions (designated as the letters A and C in FIG. 2) of the surfaces 26, 46 and the angles at which the surfaces 26, 46 lie with respect to surface 28 of the tip 24 and the angled surface 18, should be such that the surfaces 18, 46, 26, 28 seat or abut against the inside and side surfaces of the seal 34 and bearing 38, as shown in FIG. 4. This results in proper positioning of the head 16 to ensure solid seating against the seal 34 and smooth removal thereof.

As can be seen from the foregoing detailed description, the present invention provides a hand-held tool that may be utilized to quickly and accurately push a seal from an opening in a housing. The design of the inventive tool permits easy access to seals that are disposed deep within a housing or within a housing which has additional obstructions (such as bearings) therein, and facilitates removal of such seals without damaging (i.e., scoring) the inside surface of the housing.

What is claimed is:

1. A tool for pushing a seal from an opening in a housing, comprising:

an elongated shaft having a longitudinal axis;

a grip disposed at one end of the shaft;

a working head disposed at the opposite end of the shaft, the head having a surface disposed at an angle to the shaft axis and having an integrally formed tooth extending from the angled surface, the tooth being spaced from the distal end of the head so as to define a tip at the distal end, wherein adjacent surfaces of the tip and the tooth form a seal seat therebetween, the surface of the tip adjacent the tooth being arcuate and having a radius substantially equal to an inside radius of the seal, the seal seat substantially conforming to a portion of the seal so that in use the tool securely engages the seal and thereby facilitates pushing of the seal through the opening.

2. A tool as claimed in claim 1 wherein the tooth is wedge shaped and tapers as it extends from the angled surface.

3. A tool as claimed in claim 2 wherein the surface of the tooth adjacent the tip is substantially normal to the shaft axis.

4. A tool as claimed in claim 2 wherein a surface of the tooth is substantially normal to the angled surface.

5. A tool as claimed in claim 1 wherein the height of the tooth surface adjacent the tip is smaller than the dimension of the side of the seal against which the tooth abuts when in use.

6. A tool as claimed in claim 1 wherein the angled surface is arcuate, having a radius substantially equal to an inside radius of the seal.

7. A tool as claimed in claim 1 wherein the tooth is wedge shaped and tapers as it extends outward, the tooth surface adjacent the tip being substantially normal to the shaft axis and the opposing tooth surface being substantially normal to the angled surface, the height of the tooth surfaces being smaller than the dimension of the side of the seal against which the tooth abuts when in use.

8. A tool for pushing a seal from an opening in a housing, comprising:

an elongated shaft having a longitudinal axis;

a grip disposed at one end of the shaft;

a working head disposed at the opposite end of the shaft, the head having an integrally formed tooth extending from a side surface of the shaft, the tooth being spaced from the distal end of the head so as to define a tip at the distal end, wherein adjacent surfaces of the tip and the tooth form a seal seat therebetween, the surface of the tip adjacent the tooth being arcuate and having a radius substantially equal to an inside radius of the seal, the seal seat substantially conforming to a portion of the seal so that in use the tool securely engages the seal and thereby facilitates pushing of the seal through the opening.

9. A tool for pushing a seal from an opening in a housing, comprising:

an elongated shaft having a longitudinal axis;

a grip disposed at one end of the shaft;

a working head disposed at the opposite end of the shaft, the head having a surface disposed at an angle to the shaft axis and having an integrally formed tooth extending from the angled surface, the angled surface being arcuate and having a radius substantially equal to an inside radius of the seal and the tooth being spaced from the distal end of the head so as to define a tip at the distal end, wherein adjacent surfaces of the tip and the tooth form a seal seat therebetween, the seal seat substantially conforming to a portion of the seal so that in use the tool securely engages the seal and thereby facilitates pushing of the seal through the opening.

10. A tool as claimed in claim 9 wherein the tooth is wedge shaped and tapers as it extends from the angled surface.

11. A tool as claimed in claim 9 wherein the surface of the tip adjacent the tooth is arcuate, having a radius substantially equal to an inside radius of the seal.

12. A tool as claimed in claim 10 wherein the surface of the tooth adjacent the tip is substantially normal to the shaft axis.

13. A tool as claimed in claim 10 wherein a surface of the tooth is substantially normal to the angled surface.

14. A tool as claimed in claim 9 wherein the height of the tooth surface adjacent the tip is smaller than the dimension of the side of the seal against which the tooth abuts when in use.

15. A tool as claimed in claim 9 wherein the tooth is wedge shaped and tapers as it extends outward, the tooth surface adjacent the tip being substantially normal to the shaft axis and the opposing tooth surface being substantially normal to the angled surface, the height of the tooth surfaces being smaller than the dimension of the side of the seal against which the tooth abuts when in use.

* * * * *